J. BARNES.
TUBULAR LANTERN.
APPLICATION FILED MAY 13, 1914.
1,167,736. Patented Jan. 11, 1916.
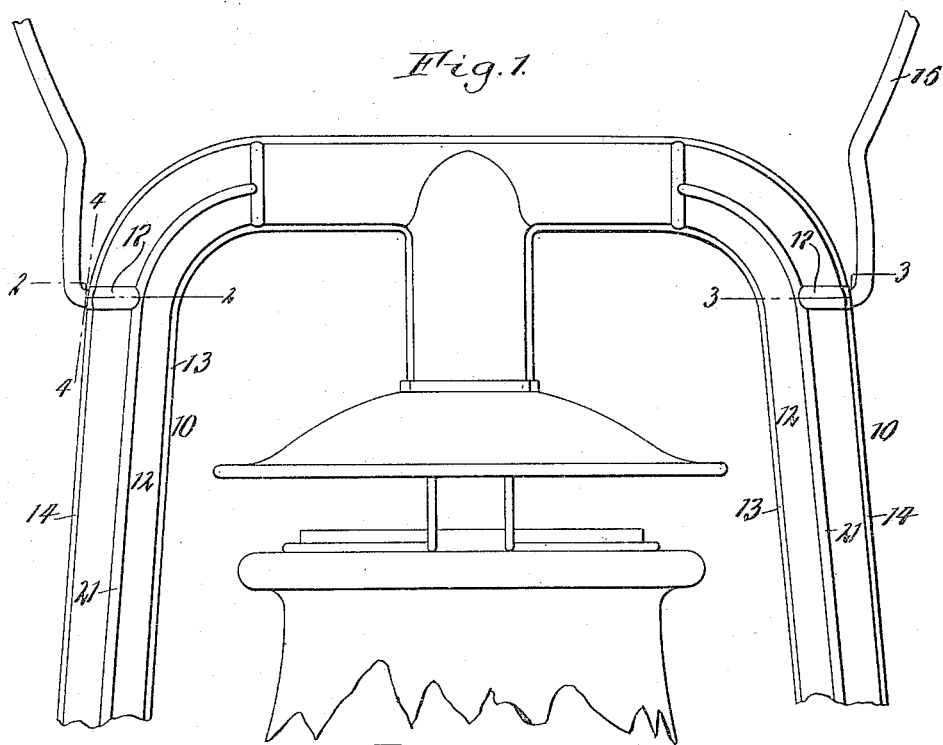
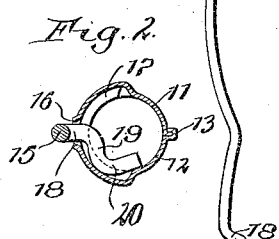
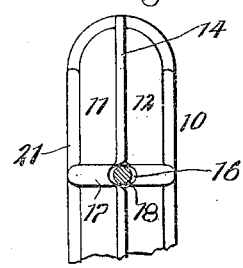
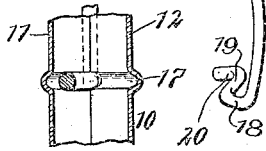
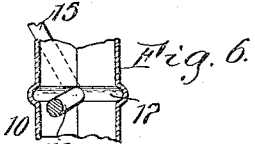

UNITED STATES PATENT OFFICE.

JAMES BARNES, OF ROCHESTER, NEW YORK, ASSIGNOR, BY MESNE ASSIGNMENTS, TO R. E. DIETZ COMPANY, OF NEW YORK, N. Y., A CORPORATION OF NEW YORK.

TUBULAR LANTERN.

1,167,736.   Specification of Letters Patent.   Patented Jan. 11, 1916.

Application filed May 13, 1914. Serial No. 838,206.

*To all whom it may concern:*

Be it known that I, JAMES BARNES, a citizen of the United States, residing at Rochester, in the county of Monroe and State of New York, have invented a new and useful Improvement in Tubular Lanterns, of which the following is a specification.

This invention relates to bails or handles for tubular lanterns and has for its object to provide an inexpensive, simple and practical bail of that type which, when placed in an upright or standing position, remains so fixed until swung down or moved sidewise by hand.

In the accompanying drawings, Figure 1 is a front elevation of the upper portion of a tubular lantern embodying this invention, with the bail in its upright position. Figs. 2 and 3 are horizontal sections taken on lines 2—2 and 3—3, Fig. 1, respectively. Fig. 4 is an elevation of the upper portion of one of the tubes with the bail in vertical section, on line 4—4, Fig. 1. Fig. 5 is a fragmentary vertical section on line 5—5, Fig. 3, showing the bail locked. Fig. 6 is a similar view, showing the bail unlocked. Fig. 7 is a perspective view of the bail. Fig. 8 is a top plan view thereof. Fig. 9 is a horizontal section through one of the tubes, showing a modified form of the bail.

As the invention is applicable to tubular lanterns of the usual patterns, only the upper portion of such a lantern is shown in the drawings.

10 represents the tubes which are of any suitable construction and, as shown in the drawings, comprise each two stamped similar parts or halves 11 and 12 united by seams 13 and 14 on their inner and outer edges in the usual manner. 15 represents the bail and 16 represents an opening formed in each tube on its outer side near its top for the reception of the end of the bail which is journaled in this opening. In stamped tubes this opening, which forms a bearing for the bail end, is formed partly in the outer edge of each half tube.

17 represents a horizontal groove or depression which is formed on the inner side of the tube and extends from the opening or bearing 16 partly around the tube. Each end of the bail is provided with an approximately horizontal journal portion 18 which rests in the bearing or opening 16 of the tube and permits the bail to turn therein. Beyond this journal portion the bail is provided with a laterally projecting locking arm 19 which engages in the groove 17 when the bail stands in an upright position, as shown in Figs. 1, 2, 3 and 5. The two journal portions 18 are arranged in line with each other and the two locking arms project perferably from opposite sides of the plane of the bail. Each arm is preferably provided with a curved or rounded end portion or head 20, as shown in Figs. 2, 3, 7 and 8, which facilitates the engagement of the arm in the locking groove or depression and the release of the arm therefrom, but this head may be omitted, if preferred, as shown in Fig. 9.

The bail being made of resilient wire it possesses sufficient elasticity to cause the locking arm 19 to spring into the locking depression 17 when the bail has reached the upright position. The bail now offers considerable resistance to a force which tends to move the bail out of this position, thereby holding the bail firmly in its upright position but permitting it to be moved out of this position by applying sufficient force for that purpose. Upon swinging the bail out of this position the locking arm 19 is moved out of the locking depression 17, as represented in Fig. 6, and the bail is then free to be turned down on its journal portions in the usual way.

As shown in the drawings, the locking depression extends horizontally from the journal opening of the tube to the longitudinal rib or bead 21 formed in the tube midway between the seams thereof. This longitudinal rib is, however, unimportant and is used only in certain styles of tubes. Two locking depressions are preferably used in each tube extending from the journal opening on both sides of the tube. One of these depressions is, however, sufficient and the other depression formed in the other half of the tube is simply to avoid the necessity of forming two different tubes, one for the right hand side and the other for the left hand side of the lantern. One locking arm on the bail is in many cases sufficient for holding the bail in an upright position but two are preferred.

I claim as my invention:

1. In a tubular lantern, the combination with a tube provided with an opening for the bail and with a locking depression formed in the wall of the tube on the inner side thereof adjacent to said opening, of a bail journaled in said opening and provided within the tube with a projecting locking arm adapted to spring into said depression when the bail reaches the upright position, thereby holding the bail yieldingly in that position.

2. In a tubular lantern, the combination with a tube provided with an opening for the bail and formed with a locking groove formed in the wall of the tube and partly encircling the tube on the inner side thereof, of a bail journaled in said opening and provided within the tube with a laterally projecting locking arm adapted to spring into said groove when the bail reaches the upright position, thereby holding the bail yieldingly in that position.

3. In a tubular lantern, the combination with a tube provided with an opening for the bail and with a locking depression formed in the wall of the tube on the inner side thereof adjacent to said opening, of a bail journaled in said opening and provided within the tube with a laterally projecting locking arm having a rounded head, which arm is adapted to spring into said depression when the bail reaches the upright position, thereby holding the bail yieldingly in that position.

Witness my hand in the presence of two subscribing witnesses.

JAMES BARNES.

Witnesses:
B. H. POMEROY,
EDWARD WILHELM.

Copies of this patent may be obtained for five cents each, by addressing the "Commissioner of Patents, Washington, D. C."